United States Patent
Gu et al.

(10) Patent No.: US 10,530,221 B2
(45) Date of Patent: Jan. 7, 2020

(54) COOLING STRUCTURE INTEGRATED WITH ELECTRIC MOTOR AND CONTROLLER

(71) Applicant: INDUSTRIAL TECHNOLOGY RESEARCH INSTITUTE, Hsin-Chu (TW)

(72) Inventors: Huan-Lung Gu, Hualien (TW); Shao-Yu Lee, Hsinchu County (TW); Shih-Kai Hsieh, Taoyuan (TW); Shih-Hsiang Chien, Yilan County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 83 days.

(21) Appl. No.: 15/854,970

(22) Filed: Dec. 27, 2017

(65) Prior Publication Data
US 2019/0165653 A1   May 30, 2019

(30) Foreign Application Priority Data
Nov. 30, 2017   (TW) .............................. 106141937 A (51) Int. Cl.
*H02K 5/20* (2006.01)
*H02K 9/19* (2006.01)
(Continued)

(52) U.S. Cl.
CPC ................. *H02K 9/19* (2013.01); *H02K 5/20* (2013.01); *H02K 11/33* (2016.01); *H02K 5/225* (2013.01)

(58) Field of Classification Search
CPC . H02K 9/19; H02K 11/33; H02K 5/20; H02K 5/225
(Continued)

(56) References Cited

U.S. PATENT DOCUMENTS 6,960,851 B2 * 11/2005 Poulin ...................... H02K 9/19
                                                      310/52
7,358,699 B2    4/2008 Kikuchi et al.
(Continued)

FOREIGN PATENT DOCUMENTS

CN        2580666 Y    10/2003
CN      202746221 U     2/2013
(Continued)

OTHER PUBLICATIONS

P.W. Wheeler et al., A Fully Integrated 30kW Motor Drive Using Matrix Converter Technology, IEEE, 2005.
(Continued)

*Primary Examiner* — Naishadh N Desai
(74) *Attorney, Agent, or Firm* — Locke Lord LLP; Tim Tingkang Xia, Esq.

(57) ABSTRACT

A cooling structure integrated with an electric motor and a controller includes a shell and a rear water jacket. The controller includes a power module and a control module. The electric motor has a rotor and a stator. The shell, shaped as a cylinder, is to sleeve the stator. The rear water jacket includes at least one assembly hole. The assembly hole is to allow at least one conductive pillar to penetrate therethrough. The rear water jacket, mounted to an axial end of the shell, is furnished with a plurality of rear water-jacket waterways. The stator electrically couples one end of the conductive pillar, while another end of the conductive pillar is connected with the power module.

13 Claims, 4 Drawing Sheets

(51) Int. Cl.
*H02K 11/33* (2016.01)
*H02K 5/22* (2006.01)

(58) Field of Classification Search
USPC .................................. 310/89, 64, 90, 54
See application file for complete search history.

(56) References Cited

U.S. PATENT DOCUMENTS

| | | | |
|---|---|---|---|
| 7,859,147 B2 | 12/2010 | Dubuc et al. | |
| 8,456,049 B2 | 6/2013 | Matsuda et al. | |
| 8,643,231 B2 | 2/2014 | Flanary | |
| 9,603,287 B1* | 3/2017 | Chien | H05K 3/0061 |
| 2012/0049665 A1* | 3/2012 | Garriga | H02K 5/20 |
| | | | 310/54 |
| 2014/0139058 A1* | 5/2014 | Wei | H02K 5/20 |
| | | | 310/59 |
| 2014/0265743 A1* | 9/2014 | Chamberlin | H02K 9/19 |
| | | | 310/68 D |

FOREIGN PATENT DOCUMENTS

| | | |
|---|---|---|
| CN | 103814515 A | 5/2014 |
| CN | 104115379 A | 10/2014 |
| CN | 104521114 A | 4/2015 |
| CN | 105830315 A | 8/2016 |
| CN | 106233589 A | 12/2016 |
| JP | H11356006 A | 12/1999 |
| TW | 252649 | 7/1995 |
| TW | I324429 B | 5/2010 |
| TW | M450905 U1 | 4/2013 |
| TW | M454669 | 6/2013 |
| TW | M460931 U | 9/2013 |
| TW | M495551 | 2/2015 |
| TW | I536715 B | 6/2016 |
| TW | 201722036 A | 6/2017 |
| TW | I590568 B | 7/2017 |
| TW | M546057 | 7/2017 |

OTHER PUBLICATIONS

Adam Shea et al., Hardware integration for an integrated modular motor drive including distributed control, IEEE, 2014.
Robert Abebe et al., Integrated motor drives: state of the art and future trends, IET, 2016.
Lei Huang, Low Cost Control of Two Three-Phase PMSMs in Integrated Motor Drives and Battery Chargers for Electric Vehicle Application, 18th International Conference on Electrical Machines and Systems (ICEMS), 2015.
Zhang, Hui, On Electric Machinery for Integrated Motor Drives in Automotive Applications, Doctoral thesis, 2017.
Alberto Tenconi et al., Temperatures Evaluation in an Integrated Motor Drive for Traction Applications, IEEE Transactions on Industrial Electronics, 2008, vol. 55, No. 10.
Intellectual Property Office Ministry of Economic Affairs, R.O.C., Office Action, dated Aug. 1, 2018, Taiwan.

* cited by examiner

COOLING STRUCTURE INTEGRATED WITH ELECTRIC MOTOR AND CONTROLLER

CROSS REFERENCE TO RELATED APPLICATION

This application claims the benefits of Taiwan application Serial No. 106141937, filed Nov. 30, 2017, the disclosures of which are incorporated by references herein in its entirety.

TECHNICAL FIELD

The present disclosure relates in general to a cooling structure integrated with an electric motor and a controller, and more particularly to the cooling structure integrated with an electric motor and a controller that allows an axial-end bearing seat of the electric motor to serve an in/out pathway of cooling water and thus to form a cooling apparatus, and allows to communicate power of the electric motor with the controller through a conductive pillar shielded by an electrical insulating sleeve.

BACKGROUND

In the art of electric motors and controllers thereof, an electronic circuit of the controller largely includes three functional modules; i.e., a control board, a power module (particularly, an intelligent power module, IPM) and a gate driver. Generally, according to usage of electric power, the controller can be sorted to a control-type controller or a power-type controller. The control-type controller uses a current with a small power for generating control signals. On the other hand, the power-type controller receives a foreign big power, such as a battery power. The received power is processed firstly, and then regulated by control signals from a control-type controller so as to provide a relevant big power for stator coils of an electric motor. As the big power flows in the stator coils for inducing an electromagnetic field to drive a rotor of the electric motor, so that a corresponding kinetic energy can be outputted. However, if the same mechanism as described above is reversed kinematically and electrically, a different function would be formulated. Namely, if the rotor of the electric motor is rotated by foreign forcing, the electric motor would react as a generator, by which the stator coils would generate a big power. Then, the power-type controller would receive this big power from the electric motor, process the big power according to control signals from the control-type controller, and then output the big power for further usage; for example, to charge a battery.

Recently, as the progress in electronic technology, a volume of controller is significantly reduced, and thus a corresponding power density is increased. Actually, such a development is good for mechatronics. Though the volume is reduced, yet the controller still needs to output a current with a big power to the electric motor. In other words, the output power of the controller is never reduced, no matter what the volume is. Nevertheless, heat generated upon running the controller is always a problem to the controller. Obviously, this heat shall be properly and quickly handled to dissipate or be removed off, or the controller would be in a jeopardy of burning down.

While in mechatronics, a move of mounting the controller to a shaft end of the electric motor will meet inevitably two difficult problems yet to be resolved.

One of these two problems is at the wiring of the stator coil of the electric motor. Specifically, while in wiring the stator coil, an arrangement of ends of electric wires does present typical difficulty. In practice, according to a phase number and a polar number of each the stator, different sets of wired coils would be provided to flow electricity so as to induce a corresponding electromagnetic field. Each of the coils has an in-flow end and an out-flow end; i.e., every coil presents two wire ends. These two wire ends shall be individually soldered, according to the wiring arrangement, to electrically couple a power-supply cable from the controller. By having a three-phase electric motor as an example, three coils are included, all wire ends of the coils would finally soldered to a ground port and three voltage ports, respectively, so as to form a specific type of stator coils, such as a Y-type wiring, a A-type wiring, and so on. Generally, each phase of the stator has at least one wire end. Soldering of this wire end shall be processed only after all the coils are assembled onto the stator (a set of silicon-steel plates) and after the stator is mounted into a stator shell of the electric motor. Namely, the assembling of all wire ends of the coils shall be performed in a limited space at one axial end of the stator inside the stator shell. Practically, this limited space is too narrow to make the assembling of the wire ends easy. Thus, the assembling quality is hard to be assured. In addition, after all the wire ends are soldered, the connection to the voltage port of the controller shall be processed. Since this connection is performed aside to the axial end of the stator shell, and if the controller is disposed close to the stator coils, then it will be difficult no matter what the connection is done by soldering or a mechanical means. Generally, a longer connection wire for connecting in between is required to establish the connection easier. However, an excessive length of the connection wire necessary to be completely squeezed into the aforesaid limited space will cause a higher impedance, and thereby a corresponding heat loss would be increased. Also, such a connection would make connection points vulnerable to break, and thus the entire quality of the electric motor would be reduced.

Another problem is also caused by the limited space, from which a reasonable arrangement for heat dissipation of the controller is hard to achieved; i.e., heat-dissipating of the controller would be hard to be satisfied. Nevertheless, it is always a problem in mechatronics to remove heat generated by a controller of an electric motor away from the limited space. In general, an air-cooling or water-cooling means can be applied to perform the heat dissipation thereof effectively. If the heat is not sufficiently dissipated, circuit components of the controller would be vulnerable to be burned down.

Namely, in order to increase the power density of a dynamic system, the output power shall be increased while the spatial occupation is kept the same or reduced simultaneously. For achieving a small spatial occupation in mechatronics, a resort of integrating the electric motor and the controller as a unique unit so as for reducing the entire volume becomes one of mainstream developments in the field of electric motors. However, in mechatronics, the reduction in the space for assembly would induce inevitably plenty shortcomings, such as design difficulty, assembly difficulty, heat-dissipation difficulty, assembly quality down, and so on. These shortcomings are issues needed to be encountered for R&D people all around the world in the industry of electric motors.

Accordingly, a development for a cooling structure integrated with an electric motor and a controller that can both resolve the aforesaid two problems in wiring arrangement and heat-dissipation of the controller, and provide advantages in simple structuring, easy assembling, well heat dissipating and quality construction is definitely urgent to the skill in the related art.

SUMMARY

In one embodiment of this disclosure, a cooling structure integrated with an electric motor and a controller includes a shell and a rear water jacket. The controller includes a power module and a control module. The electric motor has a rotor and a stator. The shell, shaped as a cylinder, is to sleeve the stator. The rear water jacket includes at least one assembly hole. The assembly hole is to allow at least one conductive pillar to penetrate therethrough. The rear water jacket, mounted to an axial end of the shell, is furnished with a plurality of rear water-jacket waterways. The stator electrically couples one end of the conductive pillar, while another end of the conductive pillar is connected with the power module.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 4 is a schematic exploded view of the rear water jacket and the shell posed at different angles to show a correct matching in between.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
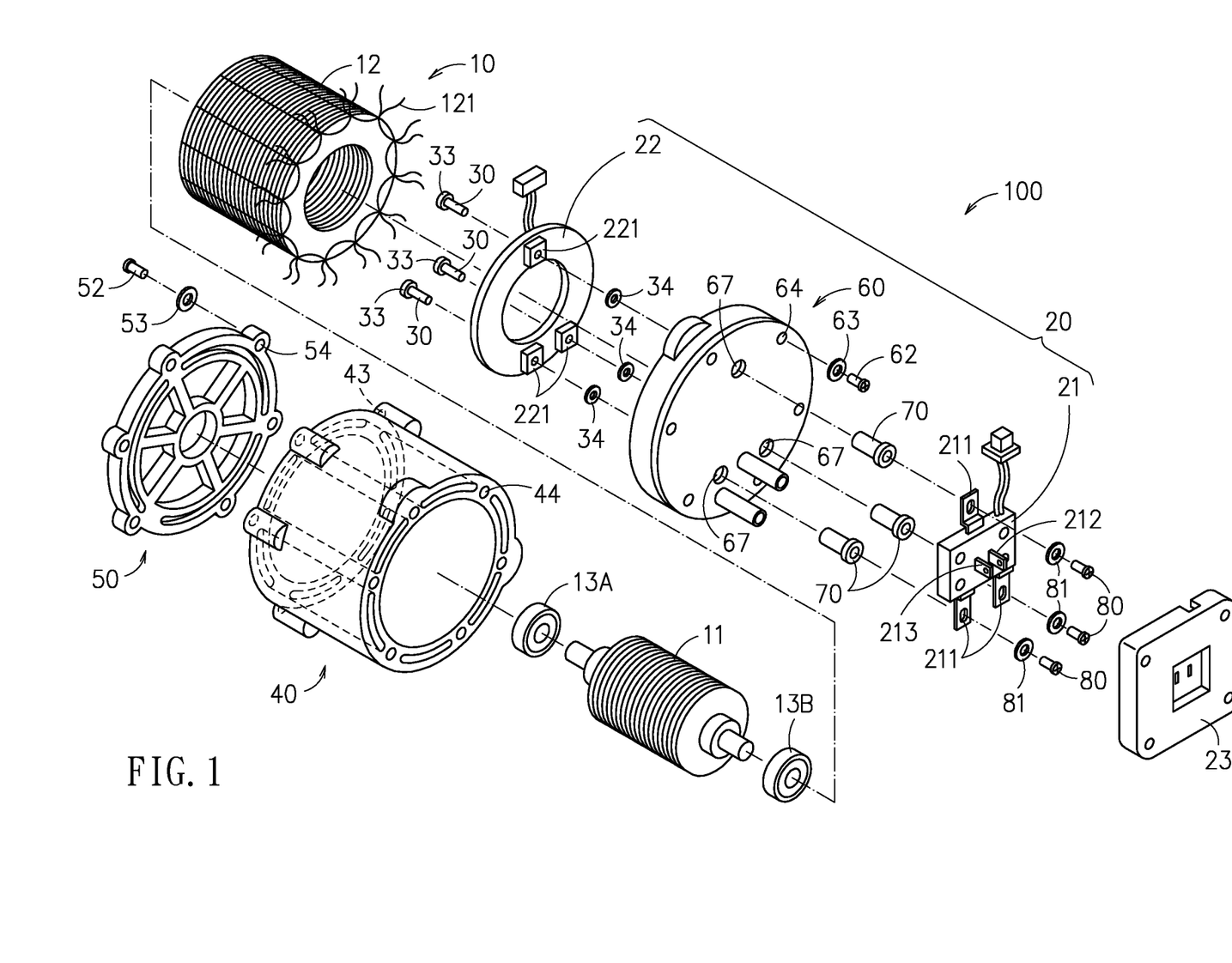
FIG. 1 is a schematic exploded view of an embodiment of the cooling structure integrated with an electric motor and a controller in accordance with this disclosure.
Figure 2:
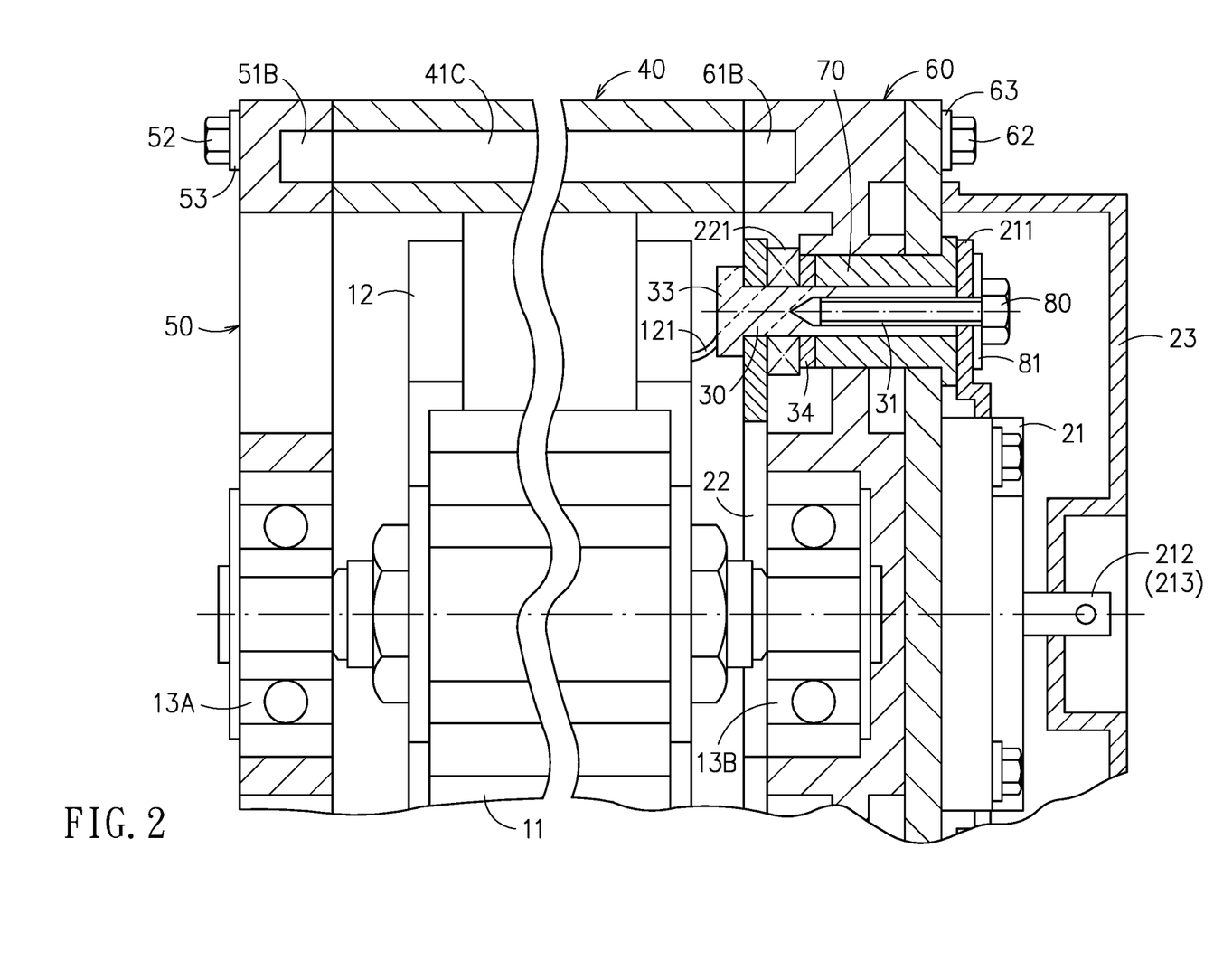
FIG. 2 is a schematic cross-sectional view of a portion of the embodiment of FIG. 1 in an assembly form, showing particularly a cooling waterway, a conductive pillar and an electrical insulating sleeve.

Referring now to the embodiment shown in FIG. 1 and FIG. 2, a cooling structure 100, which is adapted for an electric motor 10 integrated with a controller 20, mainly includes a shell 40, a front water jacket 50 and a rear water jacket 60. It shall be explained that this embodiment has a three-phase electric motor as its exemplary example. Hence, according to the specific wiring type for the three-phase motor, three conductive pillars 30 and three accompanying electrical insulating sleeves 70 are included. However, it shall be understood that the phase number and the wiring types are not limited in this disclosure. In some other embodiments, according to another specific phase number and wiring type for the electric motor, a different number of the conductive pillars 30 accompanied by the same number of the electrical insulating sleeves 70 may be applied. For example, a mono-phase electric motor may need only one conductive pillar 30 to pair one electrical insulating sleeve 70, and a two-phase electric motor may need two conductive pillars 30 to pair two electrical insulating sleeve 70. However, in the case of applying different wiring type, more conductive pillars 30 and more accompanied electrical insulating sleeves 70 might be required. In addition, in this embodiment, each of the electrical insulating sleeves 70 is provided with a fastener 80 for positioning the corresponding conductive pillar 30 and for integrating the controller 20, the rear jacket 60 and the electric motor 10 as a unit.

The electric motor 10 has a rotor 11 and a stator 12. Two axial ends of the rotor 11 are furnished with individual bearings 13A, 13B, respectively. The rotor 11 is mounted axially in the stator 12. The shell 40 shaped as a cylinder sleeves the stator 12.

The controller 20 includes a power module 21 and a control module 22. The stator 12 is electrically coupled with one end of each the conductive pillar 30 via a wire 121, while the power module 21 connects electrically another end of each the conductive pillar 30 via a power port 211. The control module 22 is furnished with three current detectors 221. Each the conductive pillar 30 penetrates through the control module 22, and also through one corresponding current detector 221. Three insulating washers 34 are furnished between the rear water jacket 60 and the control module 22, and each the conductive pillar 30 penetrates through one corresponding insulating washer 34. In this embodiment, the three current detectors 221 for measuring corresponding passing-through currents are mounted on the control module 22. Hence, preferably, each the conductive pillar 30 penetrates through both the control module 22 and the corresponding current detector 221. In the art, the current detector can be variously embodied. In some types of the current detector, the requirement for the conductive pillar 30 to penetrate through is not necessary for measuring the current value. In particular, in some electric motors, a voltage value, not a current value, is applied as a control variable. Namely, in such an application, the current detector is no more needed, but a voltage detector is applied to measure the voltage. At this time, the conductive pillar 30 does not need to penetrate the control module 22.

In addition, the end of the conductive pillar 30 that connects the wire 121 is formed to have a flange 33 for facilitating soldering or welding of the wire 121, and also for keeping this end of the conductive pillar 30 at one side of the control module 22. However, in this disclosure, it shall be understood that the shape of the conductive pillar 30 is not definitely limited to the aforesaid structuring.

The front water jacket 50 and the rear water jacket 60 are disposed to two opposing ends of the rotor 11, and have individual central bores to accommodate the bearing 13A, 13B, respectively. The front water jacket 50 and the rear water jacket 60 are individually furnished with a plurality of screw hole 54, 64, respectively. In correspondence with these screw hole 54, 64, the shell 40 is furnished with another screw holes 43, 44, respectively, to two opposing ends thereof. Thereupon, by introducing a plurality of screw bolts 52, 62, accompanied individually by a plurality of washers 53, 63 (for each number of the screw bolts, the screw holes and the washers, only one element is labeled in FIG. 1), to penetrate correspondingly through the washers 53, 63, the screw holes 54, 64, and further the another screw holes 43, 44, respectively, then the front water jacket 50 and the rear water jacket 60 can be fixed to the two opposing axial ends of the shell 40. In the foregoing mounting of the front water jacket 50 and the rear water jacket 60, anti-leak treatment can be applied to each junction surface thereof. For example, this anti-leak treatment (not shown in the figure) can be the usage of anti-leak washers or water-proof glues. Preferably, at the shell 40, each of the screw holes 43 at one axial end of the shell 40 is not aligned with any of the screw holes 44 at another axial end thereof, such that engineering of the waterways and the following production (casting for example) of the shell 40 can be much easier. Namely, in die-casting the shell 40, tooling (not shown in the figure) for forming the waterways corresponding to the front water jacket 50 and the rear water jacket 60 can be removed easier and more safely.

The rear water jacket 60 includes three assembly holes 67. Each the conductive pillar 30 penetrates through one corresponding assembly hole 67 of the rear water jacket 60, with one said electrical insulating sleeve 70 to sleeve the conductive pillar 30 so to electrically insulate the conductive pillar 30 from the control module 22 and the rear water jacket 60. Namely, each the assembly hole 67 is to allow one said electrical insulating sleeve 70 and one said conductive pillar 30 to penetrate therethrough.

In addition, an end cover 23 is provided to shield the power module 21 from the atmosphere, but allows the positive/negative electric ports 212, 213 of the power module 21 to protrude out of the end cover 23, such that the power module 21 can be energized by a foreign power source via these positive/negative electric ports 212, 213. The foreign power source (not shown in the figure) can be a battery set for providing positive/negative electricity. Through the power module 21, this positive/negative electricity would be transformed into a three-phase power. By introducing at least three power-output ports, the three-phase power can be then provided to the stator 12 in a mono-phase manner. In this disclosure, the end cover 23 can be fixed to the rear water jacket 60 by screw bolts or the like fixation means.

The electrical insulating sleeve 70 allows the conductive pillar 30 to penetrate spatially through the rear water jacket 60 safely (i.e., without direct mutual contact), and connects the corresponding power port 211 of the power module 21, such that no electric leakage would happen to the conductive pillar 30 sleeved thereinside. As described above, an axial end of the conductive pillar 30 is coupled with the stator 12, while another axial end thereof extends to penetrate orderly the control module 22, the current detector 221, the insulating washer 34, the rear water jacket 60 and finally the power port 211. The electrical insulating sleeve 70 sleeving the conductive pillar 30 penetrates the rear water jacket 60 as well. Since the electrical insulating sleeve 70 is made of a softer material, while in assembling the conductive pillar 30, the conductive pillar 30 can be firstly sent loosely through the corresponding assembly hole 67 of the rear water jacket 60, and then the electrical insulating sleeve 70 can be squeezed into the assembly hole 67 and simultaneously sleeve the conductive pillar 30, such that the conductive pillar 30 can be assembled into the rear water jacket 60 easily, and also the softer electrical insulating sleeve 70 can be the squeezed into the corresponding assembly hole 67; i.e., between the conductive pillar 30 and the rear water jacket 60. Then, the power module 21 is further mounted thereto by a direct-adding manner. Similarly, the other members are mounted orderly along an axial direction till the entire assembly work is finished. During the assembling, each mounting would never be difficult for any close spacing. Thus, the whole assembly operation in accordance with this disclosure is much easier than that in the art. As the assembly operation becomes easier, the assembly speed would be increased, and also the assembly yield would be increased. Namely, the damage rate of components during assembling would be lowered, especially damages at the stiff power cable and the solder points. Thereupon, the assembly quality would be enhanced, while the assembly cost is reduced.

Figure 3:
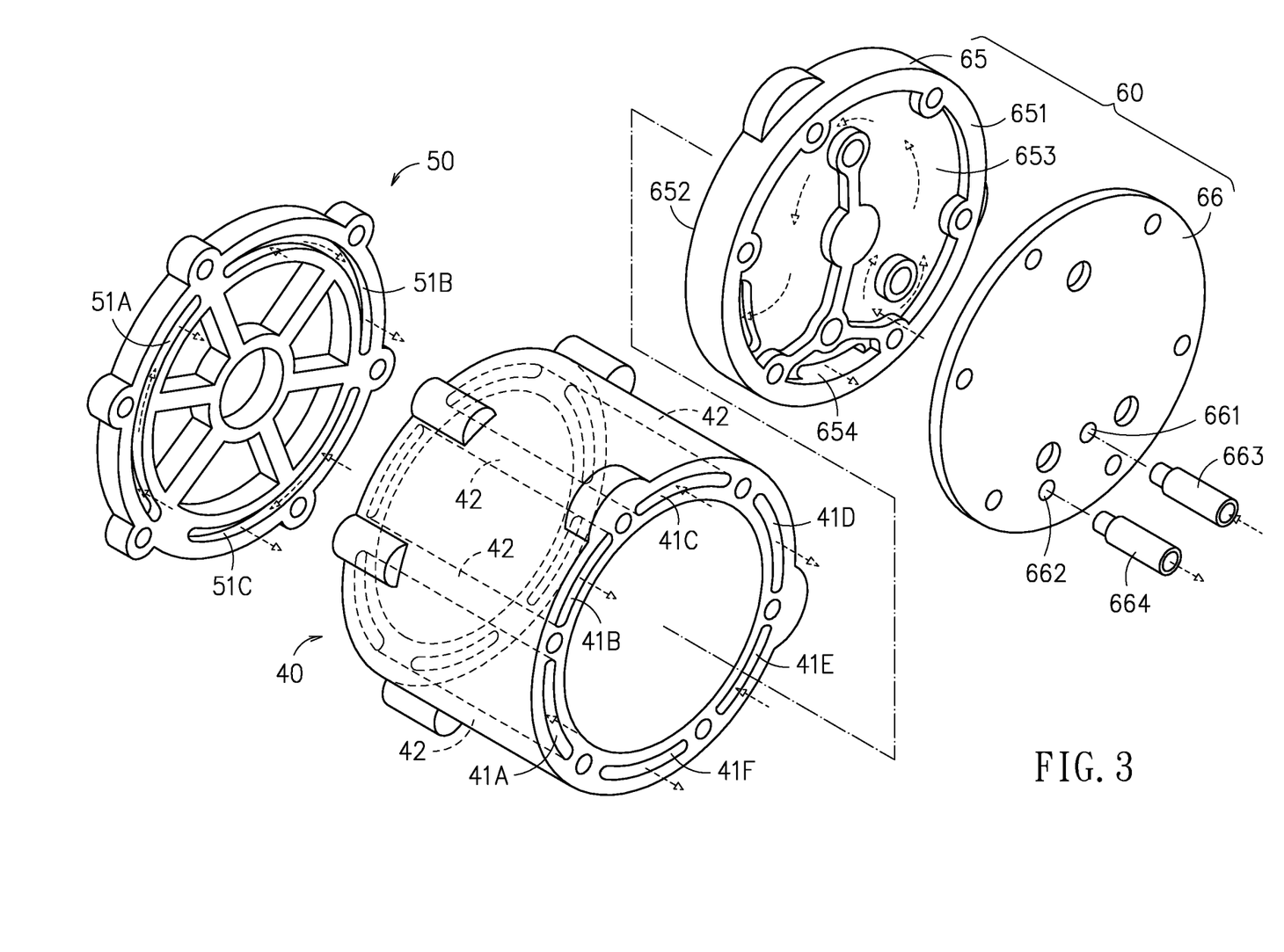
FIG. 3 is a schematic exploded view of a shell, a front water jacket and a rear water jacket in this disclosure.
Figure 4:
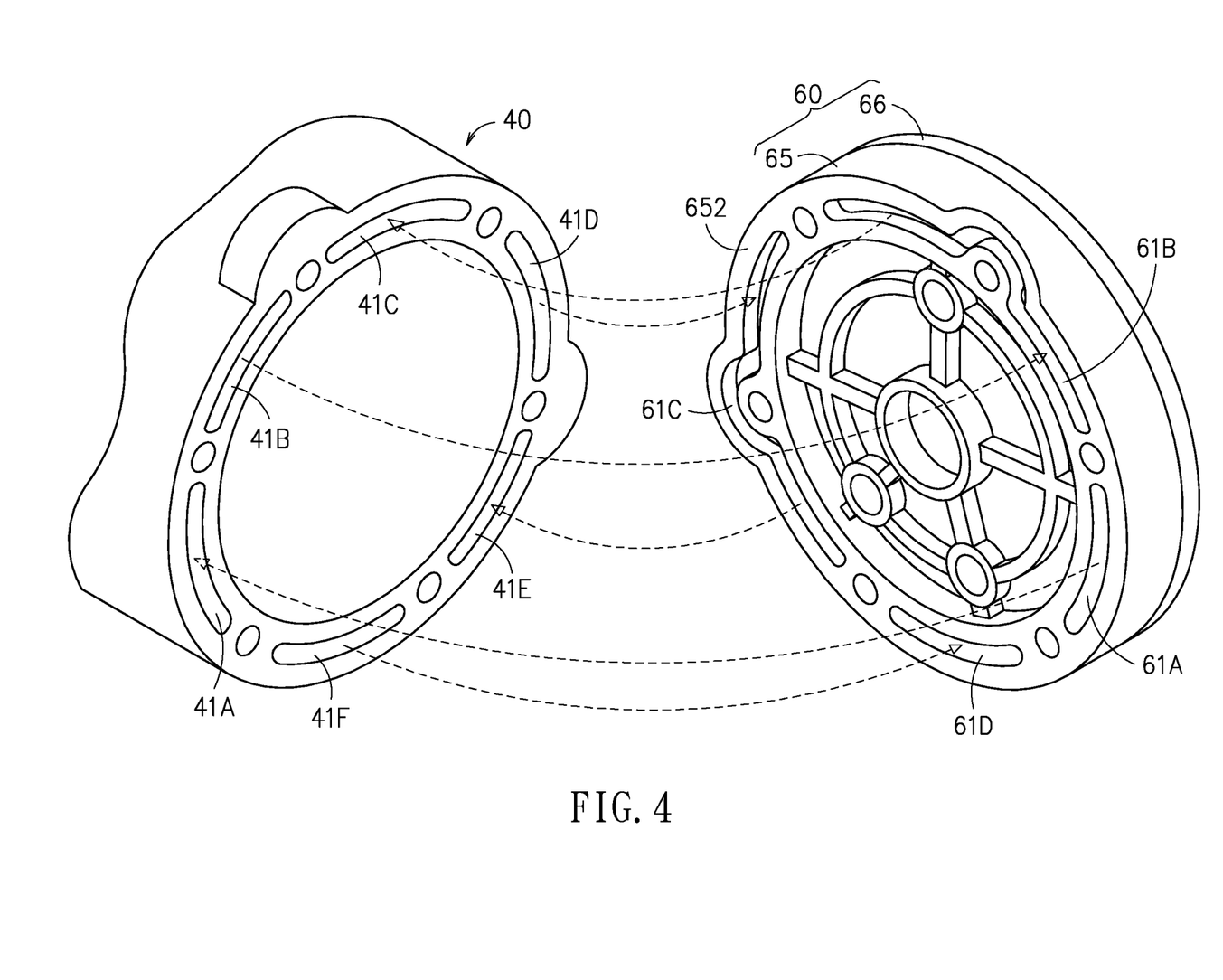

Referring now to FIG. 3 and FIG. 4, it is shown that the embodiment of the cooling apparatus in this disclosure includes, but not limited to, the shell 40, the front water jacket 50 and the rear water jacket 60. Dashed arrow lines in FIG. 3 and FIG. 4 indicate respective local flow directions of the cooling water of this disclosure.

The shell 40 is furnished thereinside with a plurality of longitudinal shell waterways 41A~41F, in which each of the shell waterways 41A~41F extends to communicate spatially two opposing axial ends of the shell 40, and these shell waterways 41A~41F are parallel to each other but spaced to each other by a wall thickness 42.

In correspondence with the shell waterways 41A~41F, the front water jacket 50 is furnished with a plurality of front water jacket waterways 51A~51C, respectively. As shown, the front water-jacket waterway 51A is corresponding to the shell waterways 41A~41B, the front water-jacket waterway 51B is corresponding to the shell waterways 41C~41D, and the front water-jacket waterway 51C is corresponding to the shell waterways 41E~41F. As shown in FIG. 2, the front water-jacket waterway 51B is connected spatially with the shell waterway 41C.

In correspondence with the shell waterways 41A~41F, the rear water jacket 60 is furnished with a plurality of rear water-jacket waterways 61A~61D (as shown in FIG. 4), respectively. As shown, the rear water-jacket waterway 61A is corresponding to the shell waterway 41A, the rear water-jacket waterway 61B is corresponding to the shell waterways 41B~41C, the rear water-jacket waterway 61C is corresponding to the shell waterways 41D~41E, and the rear water-jacket waterway 61D is corresponding to the shell waterway 41F. As shown in FIG. 2, the rear water-jacket waterway 61B is connected spatially with the shell waterway 41C.

By providing the shell waterways 41A~41F, the front water-jacket waterways 51A~51C and the rear water-jacket waterways 61A~61D can be then integrated to form a continuous cooling water route having an water inlet and an water outlet, for allowing the cooling water to flow in and out of the cooling water route, respectively.

In this embodiment, the rear water jacket 60 includes a rear water-jacket seat 65 and a cover plate 66 connected fixedly with the rear water-jacket seat 65 by screw bolts (not shown in the figure) or any connecting means the like. The rear water-jacket seat 65 has a first surface 651 and a second surface 652 opposing to the first surface 651. The second surface 652 faces the shell 40. The cover plate 66 is mounted to the first surface 651. On the first surface 651, an inlet waterway 653 and an outlet portion 654 are constructed. The design of the inlet waterway 653 is not specifically limited. Referring to the dashed arrow lines in FIG. 3, it is the basic requirement that the first surface 651 shall allow the cooling water to flow thereon as thoroughly as possible. On the other hand, the second surface 652 is furnished with a plurality of rear water-jacket waterways 61A~61D (as shown in FIG. 4). The inlet waterway 653 connects spatially with the rear water-jacket waterway 61A, while the outlet portion 654 connects spatially with the rear water-jacket waterway 61D. The cover plate 66 is furnished with an inlet hole 661 and an outlet hole 662 for connecting spatially with the inlet waterway 653 and the outlet portion 654, respectively. The inlet hole 661 and the outlet hole 662 are further connected spatially with an inlet pipe 663 and an outlet pipe 664, respectively. Upon the aforesaid structuring, a water inlet consisted of the inlet pipe 663 and the inlet hole 661 and a water outlet consisted of the outlet pipe 664 and the outlet hole 662 are simultaneously formed at the cover plate 66. The water inlet connects spatially with the inlet waterway 653, while the water outlet is connected spatially with the outlet portion 654. After the cooling water enters the inlet waterway 653 via the inlet pipe 663, it flows through the rear water jacket waterway 61A, and then enters the shell waterway 41A. On the other hand, the water outlet is to allow the cooling water to flow out of the rear water jacket 60, where the cooling water flows into the rear water-jacket waterway 61D from the shell waterway 41F.

By providing the shell waterways 41A~41F, the front water-jacket waterways 51A~51C, and the rear water-jacket waterways 61A~61D, the flow route of the cooling water would be: inlet pipe 663→inlet hole 661→inlet waterway 653→rear water-jacket waterway 61A→shell waterway 41A→front water-jacket waterway 51A→shell waterway 41B→rear water jacket waterway 61B→shell waterway 41C→front water-jacket waterway 51B→shell waterway 41D"rear water-jacket waterway 61C→shell waterway 41E→front water jacket waterway 51C→shell waterway 41F→rear water-jacket waterway 61D→outlet portion 654→outlet hole 662→outlet pipe 664.

The cooling water exhausted by the outlet pipe 664 would carry the heat generated inside the apparatus, and the heat would be further dissipated through a heat sink or the like (not shown in the figure).

It shall be explained that, in this disclosure, the water inlet and the water outlet can be constructed at the shell 40 as well. Upon such an arrangement, the cooling water can enter the shell waterway 41A via the water inlet at the shell 40, and the cooling water in the shell waterway 41F can leave the apparatus via the water outlet at the shell 40. Hence, in this embodiment, the inlet waterway 653, the outlet portion 654 and the cover plate 66 can be removed. For example, in the case that the inlet pipe 663 and the outlet pipe 664 are individually connected to the shell waterway 41A and the shell waterway 41F, respectively, then the flow route of the cooling water would be: inlet pipe 663→shell waterway 41A→front water jacket waterway 51A→shell waterway 41B→rear water-jacket waterway 61B→shell waterway 41C→front water-jacket waterway 51B→shell waterway 41D→rear water jacket waterway 61C→shell waterway 41E→front water-jacket waterway 51C→shell waterway 41F→outlet pipe 664.

Similarly, in this disclosure, the water inlet and water outlet can be constructed at other positions of the cooling water route, and the flow route of the cooling water would be altered accordingly. In addition, in this disclosure, the number of the shell waterways at the shell 40 may be different to six if the dimensions of the shell 40 is varied. At this time, the number of the front water jacket waterway or the rear water-jacket waterway may be changed as well. In addition, in another embodiment of this disclosure, the cooling apparatus can be consisted of the shell 40 and the rear water jacket 60. By appropriately arranging positions of the water inlet and the water outlet and also the corresponding waterways, the flow route of the cooling water can thus be properly decided.

Referring now to FIG. 1 and FIG. 2, the rear water jacket 60 is disposed between the electric motor 10 and the power module 21. Since the power module 21 can produce lots of heat, thus the cooling apparatus of this disclosure, including the shell 40, the front water jacket 50 and the rear water jacket 60, can provide excellent heat dissipation upon the power module 21. Since the high-temperature power module 21 is separated to dispose close to the outer side of the rear water jacket 60 that provides a larger open space, so a heat-dissipation policy can be easier determined, and also the foreign power can be easily introduced.

In this disclosure, the aforesaid cooling water route provided by integrating the shell 40, the front water jacket 50 and the rear water jacket 60 is only one of many embodiments. In practice, the arrangement of the waterways may be various. For example, by considering that only the power module 21 could generate lots of heat, it might be acceptable to only have the rear water jacket 60 furnished with the water-jacket waterways.

In summary, the cooling structure integrated with an electric motor and a controller provided by this disclosure is to construct waterways at the stator shell of the electric motor so as to cooperate with the waterways at the rear water jacket, or to construct the front and rear water jackets to sandwich axially the stator shell by establishing a flow-through cooling water route for the water-cooling apparatus. Also, the controller (especially the power module) is adhered onto the cooling structure having assembly holes for allowing individual pairs of the electrical insulating sleeve and the conductive pillar to electrically couple the electric motor and the controller without short-cutting at the stator shell, and thus the entire volume of the cooling apparatus can be reduced, the assembly of power wires can be simplified, and importantly the aforesaid shortcomings in the limited spacing for assembling the conventional cooling apparatus do no more exist after applying the cooling structure of this disclosure as described above.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A cooling structure integrated with an electric motor and a controller, the controller including a power module and a control module, the electric motor having a rotor and a stator, the cooling structure integrated with the electric motor and the controller comprising:

a shell, shaped as a cylinder to sleeve the stator; and a rear water jacket, including at least one assembly hole, the at least one assembly hole allows at least one conductive pillar to penetrate through, the rear water jacket being mounted to an axial end of the shell, the rear water jacket being furnished with a plurality of rear water jacket waterways, wherein the stator electrically couples one end of the at least one conductive pillar, while another end of the at least one conductive pillar connects the power module.

2. The cooling structure integrated with an electric motor and a controller of claim 1, wherein the shell is furnished with a plurality of shell waterways extending individually to communicate spatially the axial end with another opposing axial end of the shell and being parallel to each other.

3. The cooling structure integrated with an electric motor and a controller of claim 2, further including a front water jacket mounted to the another axial end of the shell, the front water jacket being furnished with a plurality of front water jacket waterways in correspondence with the shell waterways, wherein the plurality of shell waterways, the plurality of front water-jacket waterways and the plurality of rear water-jacket waterways are integrated to form a continuous cooling water route.

4. The cooling structure integrated with an electric motor and a controller of claim 3, wherein the front water jacket and the rear water jacket are disposed to two axial ends of the rotor, respectively, and accommodate two bearings located at the two axial ends of the rotor, respectively.

5. The cooling structure integrated with an electric motor and a controller of claim 1, wherein the rear water jacket is disposed to one axial end of the rotor and accommodates a bearing located at the axial end of the rotor.

6. The cooling structure integrated with an electric motor and a controller of claim 1, further including at least one electrical insulating sleeve to sleeve the at least one conductive pillar and to penetrate through the at least one assembly hole of the rear water jacket, the at least one electrical insulating sleeve being to electrically isolate the at least one conductive pillar, the control module and the rear water jacket.

7. The cooling structure integrated with an electric motor and a controller of claim 1, wherein the rear water jacket is disposed between the control module and the power module.

8. The cooling structure integrated with an electric motor and a controller of claim 7, further including at least one insulating washer located between the rear water jacket and the control module, the at least one conductive pillar penetrating through the at least one insulating washer.

9. The cooling structure integrated with an electric motor and a controller of claim 1, wherein the rear water jacket has a water inlet and a water outlet, the water inlet allows cooling water to enter the rear water-jacket waterways, and the water outlet allows the cooling water in the rear water-jacket waterways to leave the rear water jacket.

10. The cooling structure integrated with an electric motor and a controller of claim 9, wherein the rear water jacket includes:
   a rear water-jacket seat, having a first surface and a second surface opposing to the first surface, the second surface facing the shell, the first surface having an inlet waterway and an outlet portion, the second surface having the plurality of rear water jacket waterways, the inlet waterway being connected spatially with one of the rear water jacket waterways, the outlet portion being connected spatially with another one of the rear water-jacket waterways; and
   a cover plate, mounted to the first surface, having the water inlet and the water outlet, the water inlet connecting the inlet waterway, and the water outlet connecting the outlet portion.

11. The cooling structure integrated with an electric motor and a controller of claim 2, wherein the shell has a water inlet and a water outlet, the water inlet allows cooling water to enter the shell waterways, and the water outlet allows the cooling water in the shell waterways to leave the shell.

12. The cooling structure integrated with an electric motor and a controller of claim 1, further including a fastener to position the at least one conductive pillar and to integrate the controller, the rear water jacket and the electric motor as a unit.

13. The cooling structure integrated with an electric motor and a controller of claim 1, wherein the at least one conductive pillar penetrates the control module.

* * * * *